(No Model.)

H. L. CHAPMAN.
INTERMITTENT GRIP DEVICE.

No. 449,732.                               Patented Apr. 7, 1891.

Witnesses.
M. A. Sweet
Agatha Sweet

Inventor.
Herman L. Chapman

UNITED STATES PATENT OFFICE.

HERMAN L. CHAPMAN, OF WHITE PIGEON, MICHIGAN.

INTERMITTENT GRIP DEVICE.

SPECIFICATION forming part of Letters Patent No. 449,732, dated April 7, 1891.

Application filed May 8, 1889. Serial No. 310,020. (No model.)

*To all whom it may concern:*

Be it known that I, HERMAN L. CHAPMAN, a citizen of the United States, residing at White Pigeon, in the county of St. Joseph and State of Michigan, have invented a new and useful Improvement in Intermittent Grip Devices, of which the following is a specification.

My invention relates to improvements in that class of intermittent grips in which two pieces of mechanism will be automatically locked together whenever either piece shall be moved in a certain direction as relative to the other piece, and whenever this relative motion shall be reversed the two pieces so locked shall be automatically unlocked, thereby allowing the two pieces to move free and independent of each other so long as that relative direction is maintained.

The objects of my invention are, first, to furnish a noiseless grip that will operate surely and quickly without liability to slip when the gripping-surfaces become oiled; second, to provide a cheap noiseless intermittent grip that can be used for the purpose of converting the vibratory motions of foot-treadles or hand-levers into continuous rotary motion for the purpose of driving hand and foot power machines; third, to provide a quick-acting intermittent grip that will stand heavy loads or strains and can be used as an automatic lock to prevent any backward motion of machinery; fourth, to provide a noiseless intermittent grip suitable for use in traction-machines in which the traction-wheels may turn backward freely or may not turn as fast as the driven shaft, as in reapers, mowers, lawn-mowers, &c. I attain these objects by mechanism illustrated in the accompanying drawings, in which—

Figure 1:
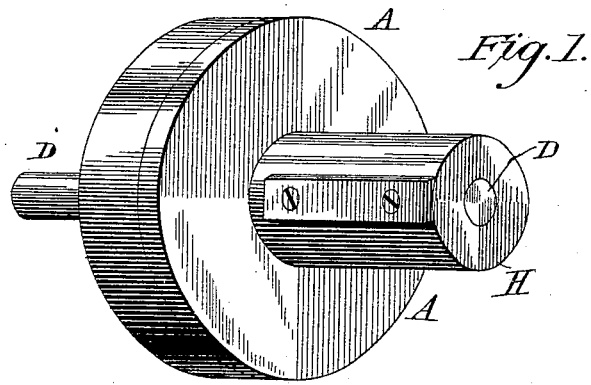
Figure 2:
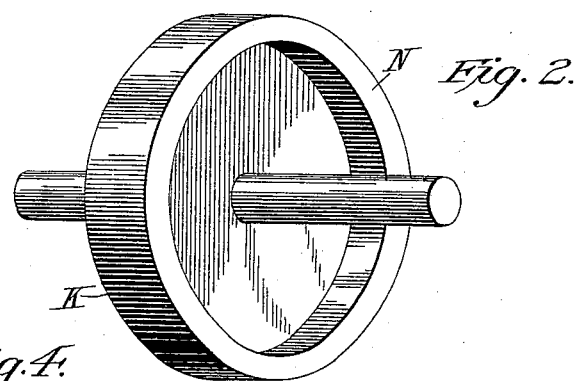
Figure 4:
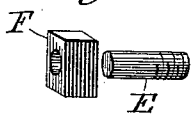
Figure 3:
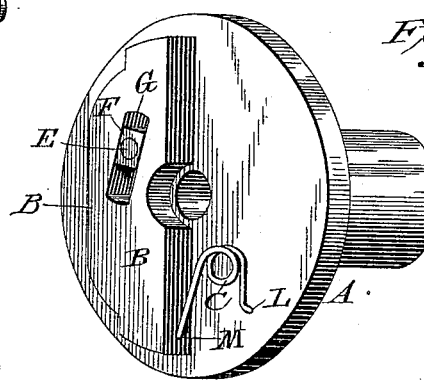

Figure 1 is a view of my intermittent grip device as closed and in position on its shaft. Figs. 2, 3, and 4 are views of its several parts in detail.

Similar letters refer to similar parts throughout the several views.

K, Fig. 2, represents a wheel or disk having a side projecting rim or flange N, the inner side of which rim is turned smooth and true with the shaft and forms the surface upon which the gripping or locking is done. This wheel is centrally bored to receive a shaft.

A, Figs. 1 and 3, represents a disk-wheel, which may have a hub projecting from its outer face side, as shown at H. It is also provided with a pin E, which is screwed into or otherwise firmly fastened to disk A and projects from the inner face side of disk A to receive and carry the sliding block F. Disk A is also centrally bored to receive its shaft and is provided with a hole at L to receive the end of spring C, as shown. Wheel or disk A may be given an oscillating rotary motion by means of straps wound around the hub H in opposite directions or by other suitable means.

B, Fig. 3, represents one form of gripping-block or locking-piece, which may consist of either wood or metal or a part of each. This block may be varied in form; but its thickness must be a little less than the depth of rim N of wheel K and its length a little less than the inside diameter of rim N, and should have its ends cut in shape to fit the inner surface of said rim for a short distance. The balance of that part of block B that comes nearest the rim N should be cut away, so that it can never come in contact with said rim except at or near its ends. It must also be cut away on that side that comes nearest the center, so that it can never strike the shaft. Gripping-block B is also mortised, as shown at G, to receive sliding block F upon wrist-pin E of disk A in such a manner that the side walls of said mortise shall be at an angle to the line of motion of said sliding block and pin in its motion around the shaft, said walls forming two parallel inclined planes, upon which sliding block F acts in opposite directions, causing the locking or releasing of the wheel K by gripping-block B, according to the relative motion of the disk and wheel K. This mortise must be of length sufficient to allow the required end motion of block F. This mortise G must not be located at the center of the block B, but nearer one end. Near that end of the block B opposite from the mortise a hole is made in its edge to receive the end of spring C, as shown at M.

F, Fig. 4, represents an oblong block of metal, which I designate as a "sliding block." It is centrally bored to receive the smooth end of pin E at a working fit, and is of same thickness as gripping-block B above described.

E, Fig. 4, represents a wrist-pin, one end of which is threaded to screw into disk A, the smooth end to project from the inner face side of disk A to carry block F, as described.

The spring shown at C, Fig. 3, consists of a piece of wire having a single coil and two projecting ends, which ends are bent at short angles, one to enter hole L in disk A, the other to enter hole M in gripping-block B. This spring serves the purpose of keeping a slight contact between that end of gripping-block B and inner surface of rim N of wheel K, Fig. 2.

The action of this gripping device is as follows: Suppose the shaft D to be in connection with the machine to be driven and the wheel K keyed to the shaft D, the disk A to be loose upon shaft D and having an oscillating rotary motion, all the parts being in proper places, and the device closed, as shown in Fig. 1, and the spring C holding that end of gripping-block B against the inner surface of rim N of wheel K with a slight pressure. Now any motion of the disk A which would tend to move the pin E and sliding block F in the mortise G of gripping-block B toward spring C would cause the gripping-block B to move outward or away from the shaft D until its mortise end also comes in contact with the inner surface of rim N. Now both ends of gripping-block B being in contact with rims N, they are held firmly against said rim by the pressure of pin E through sliding block F, whose point of bearing on block B is located between the points of bearing of block B on rim N, thereby locking them firmly together, causing wheel K to rotate in unison with wheel A so long as wheel A moves in that direction. Now should the wheel A suddenly stop or be given a motion in the opposite direction, which would tend to carry pin E and sliding block F in mortise G of gripping-block B away from spring C, such motion would cause the gripping-block B to be drawn toward the center or shaft D, thereby carrying the mortise end of block B backward or toward the shaft, releasing it from rim N, allowing wheel K to move on in the direction first above named. Thus by continuing the oscillations of wheel A a continuous rotary motion is imparted to wheel K and shaft D.

It is obvious that this grip may be reversed in its action, the oscillating motion being imparted to wheel K, in which case wheel A would be the driven wheel, having a continuous rotary motion; or this device may be used upon a stationary shaft, in which case both wheels A and K would turn freely upon the shaft and the machinery to be driven would be connected with the wheel having a continuous rotary motion by any suitable means.

As a lock to prevent backward motion of machinery, one of the wheels A or K shall be firmly attached to a rotating shaft or part of machine, the other wheel to be held in a fixed position by any suitable arrangement, but in such a manner as to allow the machine to move forward freely, but to lock the same on the slightest motion backward.

I make no claim to having invented a disk-wheel or a wheel having a side projecting rim; neither do I claim to have invented anything relative to the manner in which an oscillating rotary motion is imparted to either wheel A or K; but my invention relates purely to the gripping devices.

Having described my improvement, what I claim as my invention, and wish to secure by Letters Patent, is—

An intermittent gripping device consisting of a shaft, a wheel having a projecting flange mounted on said shaft, a disk-wheel contiguous to said flanged wheel and provided with a hub loose on said shaft, a pin projecting from the face of said disk-wheel, a sliding block on said pin, and a gripping-block having an inclined or diagonal mortise or slot therein to receive the sliding block, said gripping-block adapted to be acted upon by the sliding block to cause it to engage or grip the projecting flange on said flanged wheel, substantially as described.

HERMAN L. CHAPMAN.

In presence of—
M. A. SWEET,
AGATHA SWEET.